United States Patent
Cruickshank et al.

(10) Patent No.: US 6,898,176 B1
(45) Date of Patent: May 24, 2005

(54) COMMUNICATIONS TERMINAL AND OPERATING METHOD

(75) Inventors: David George Melville Cruickshank, Edinburgh (GB); Sascha Marcus Spangenberg, Edinburgh (GB)

(73) Assignee: The University Court of the University of Edinburgh, Edinburgh (GB)

( * ) Notice: Subject to any disclaimer, the term of this patent is extended or adjusted under 35 U.S.C. 154(b) by 0 days.

(21) Appl. No.: 09/554,426

(22) PCT Filed: Nov. 12, 1998

(86) PCT No.: PCT/GB98/03401
§ 371 (c)(1),
(2), (4) Date: Jul. 21, 2001

(87) PCT Pub. No.: WO99/26370
PCT Pub. Date: May 27, 1999

(30) Foreign Application Priority Data

Nov. 14, 1997 (GB) .............................. 9724048

(51) Int. Cl.$^7$ .......................... H04B 7/216; H04J 13/02
(52) U.S. Cl. ...................... 370/210; 370/342; 375/150
(58) Field of Search ................................ 370/204, 210, 370/320, 342, 479, 201, 208, 209; 375/150, 134, 148, 152, 343

(56) References Cited

U.S. PATENT DOCUMENTS

| | | | |
|---|---|---|---|
| 5,271,034 A | | 12/1993 | Abaunza |
| 5,305,286 A | | 4/1994 | Woodsum et al. |
| 5,463,657 A | * | 10/1995 | Rice .............................. 375/150 |
| 5,553,062 A | * | 9/1996 | Schilling et al. ............. 370/479 |
| 5,629,929 A | * | 5/1997 | Blanchard et al. ........... 370/201 |
| 6,014,416 A | * | 1/2000 | Shin et al. ................... 375/368 |
| 6,134,264 A | * | 10/2000 | Shiba et al. ................. 375/150 |

FOREIGN PATENT DOCUMENTS

| | | | |
|---|---|---|---|
| EP | 0892528 | | 1/1999 |
| FI | WO 96/24206 | * | 8/1996 |
| WO | WO 96/24198 | * | 8/1996 |
| WO | 9626579 | | 8/1996 |

OTHER PUBLICATIONS

P.M. Grant et al. "Doppler estimation for fast cquisition in spread spectrum communication systems", pp106–108.*
R.A. Stirling–Gallacher, A.P. Hulbert, G.J.R. Povey, "A Fast Acquisition Technique for a Direct Sequence Spread Spectrum Signal in the Presence of a Large Doppler Shift", XP–002102996, p. 156–160, 0–7803–3567–8/96, IEEE.
P.M. Grant et al. "Doppler estimation for fast acquisition in spread spectrum communication systems", XP–002102967, p. 106–110, 0–7803–4281–X/97, IEEE.

* cited by examiner

*Primary Examiner*—Afsar Qureshi
(74) *Attorney, Agent, or Firm*—Donald R. Piper, Jr.; Dann, Dorfman, Herrell and Skillman (57) ABSTRACT

A non-coherent technique employs a zero padded FFT for the fast acquisition of direct sequence spread spectrum signals in the presence of large Doppler shifts. The application of a FFT to code acquisition results in decreased acquisition time, and can improve the probability of detection. A set of partial correlators (1) and a zero padded FFT (2) are used to reduce the search region for code acquisition while maintaining good frequency resolution for Doppler offset. This approach will prove most pertinent in future reconfigurable terminals.

12 Claims, 5 Drawing Sheets

Fig. 1 PRIOR ART

⊗ Correct code phase and Doppler

COMMUNICATIONS TERMINAL AND OPERATING METHOD

BACKGROUND OF THE INVENTION

The present invention relates to a communications terminal and a method of operating a communications terminal.

The inflexibility of frequency division multiple access and time division multiple access techniques has resulted in the development of new systems based on the uncoordinated spread spectrum concept. In these new systems, the bits of slow speed data traffic from each subscriber are multiplied by a high chip rate spreading code, forcing each low bit rate (narrowband) data signal to fill a wide channel bandwidth. Many subscribers can then be accessed by allocating a unique, orthogonal spreading code to each. This constitutes a code division multiple access (CDMA) system. In the receiving terminal, the desired signal is detected by correlation against a local reference code which is identical to the particular spread spectrum code employed prior to transmission.

Rapid initial code acquisition and re-acquisition is crucial in CDMA communications. DOPPLER or local oscillator offsets can lead to frequency uncertainty which make this task particularly difficult. Existing strategies for code acquisition are single and multiple dwell detectors, matched filters, sequential detection and parallel detectors. In the presence of frequency uncertainty, the most common approach is to sequentially search all code phases over the range of anticipated frequency offsets. This brute force approach is laborious and can lead to large acquisition times.

Current second generation mobile communication systems cannot provide sufficient capacity to support the future demands of increased subscribers and higher data rates for multimedia communications. Third generation systems will be required to provide multiple access schemes which are capable of flexible data rates and variable services. However, it will considerably aid the acceptance of third generation systems if existing standards, infrastructures and components can be reused or reconfigured.

One common way of acquiring a direct sequence spread spectrum (DS-SS) signal is through the use of an energy detector at the output of the despreader. This approach works by tuning the code phase and frequency offset of a complex matched filter over the range of possible phase and frequency offsets anticipated in the system. When the phase of the desired spreading sequence (usually measured in terms of code chips) and local oscillator frequency offset are within specified limits, the detector will produce an output which exceeds some threshold and the system will register the presence of the desired user. This initial acquisition will then trigger a verification loop which confirms the presence of the desired code sequence and subsequently a tracking loop which attempts to continuously maintain close alignment between the two code sequences in order to track any fluctuations. If the desired spreading sequence phase and frequency offset are not within the limits, the output of the detector will not exceed the threshold, and the search for initial acquisition will continue.

Figure 1:
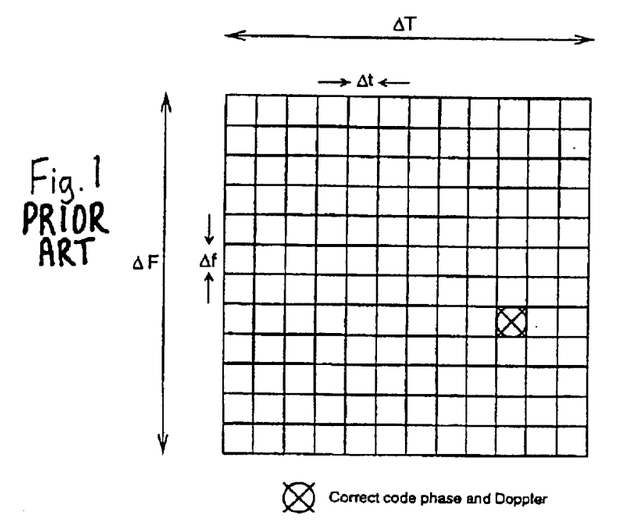
FIG. 1 is a diagram showing the search region for a conventional CDMA energy detector acquisition system.

The number of possible search bins will be determined by the product of the number of possible code phase offsets (typically a half chip search is employed over the entire sequence), and the total range of possible Doppler offsets. The width of each Doppler bin is in turn determined by the frequency response of the complex correlator, thus yielding a 2-dimensional search plane as depicted in FIG. 1. The acquisition cells system sequentially searches this grid by aligning the reference code phase and frequency offset to the centre of each cell. The time required in order to obtain an initial acquisition will therefore depend directly on the number of cells in the search region. For systems with long spreading codes, which might experience large Doppler offsets, this acquisition time may prove prohibitively large.

We will consider, for example, a system with random codes of length 200, in which the range of possible Doppler shifts is +/−32 kHz. The normalised frequency response of a complex matched filter (MF) is a function of the Doppler frequency offset $\Delta f$, as given below.

$$|H(\Delta f)| = \frac{1}{M} \frac{\sin(M\pi\Delta f T_c)}{\sin(\pi\Delta f T_c)} \quad (1)$$

Figure 2:
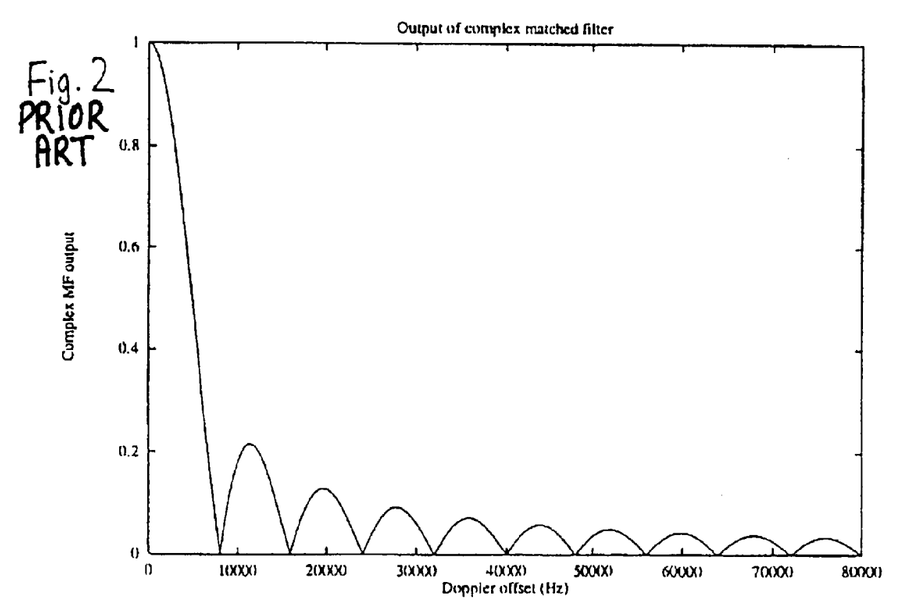
FIG. 2 shows the frequency response of a complex matched filter correlator.

In (1), M is the length of the spreading code, $\Delta f$ is the Doppler frequency offset and $T_c$ is the chip duration. FIG. 2 depicts the frequency response of a complex MF for a data rate of 8 kHz (M=200, $T_c$=625 ns). We see that the 3 dB bandwidth of the complex MF with these parameters is around 4 kHz. This will result in a total of $(200\times2)\times(64/4)$= 6400 cells which the energy detector must search. It has therefore been proposed, for example in Sust et al, "Rapid Acquisition Concepts for Voice Activated CDMA Communication" IEEE Globecom 90, pp 1820–1828, and in Stirling-Gallacher et al "A Fast Acquisition Technique for a Direct Spread Signal in the Presence of a Large Doppler Shift" IEEE ISSSTA 96, pp 156–160, to introduce a FFT based improvement to the energy detector which will reduce the number of possible cells by evaluating a reduced search space.

Figure 3:
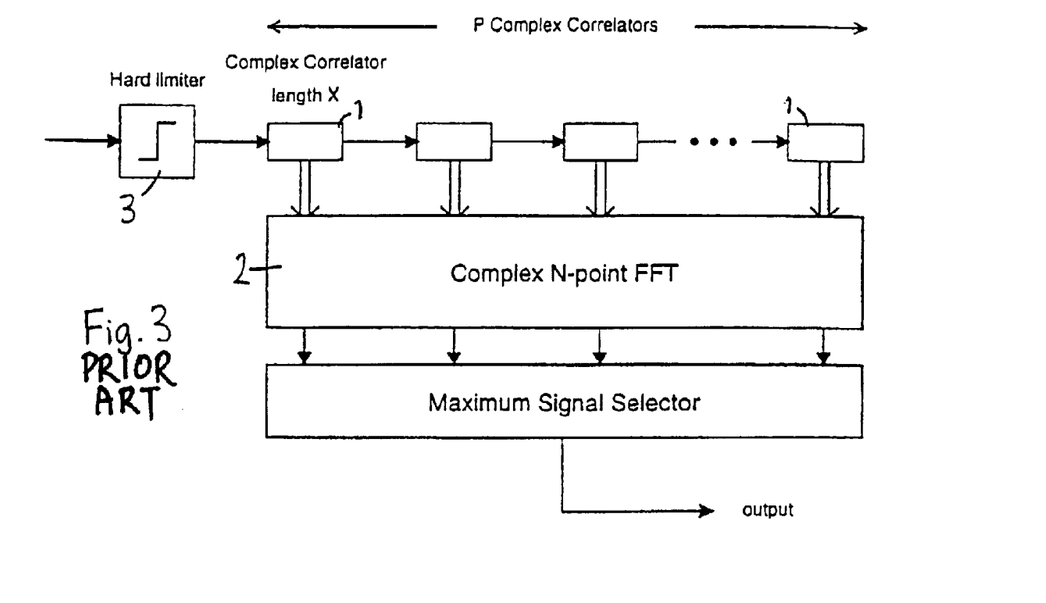
FIG. 3 is a block circuit diagram of an FFT based acquisition systems adapted from that of Sust et al.

By re-examining FIG. 1, it would be possible to substantially reduce the acquisition time, if it were possible to search all possible code Doppler cells simultaneously. By employing a FFT block as part of the acquisition system it would be possible to perform this form of search procedure. A block diagram of such a FFT enhanced acquisition system is shown in FIG. 3.

The system consists of P complex matched filter correlators 1, each of length X, such that the product X×P equals the code length M. The first correlator will contain the first X chips of the spreading sequence, the second will contain the next X chips, and so on through the P correlators. The outputs of the P correlators are therefore partial correlation results. These partial results are then passed to a N-point FFT 2, where N=P. The processing gain of this receiver is the same as the original energy detector, however if the correlator length X is chosen correctly, the addition of FFT processing allows the simultaneous search of all possible code Doppler shifts.

Figure 4:
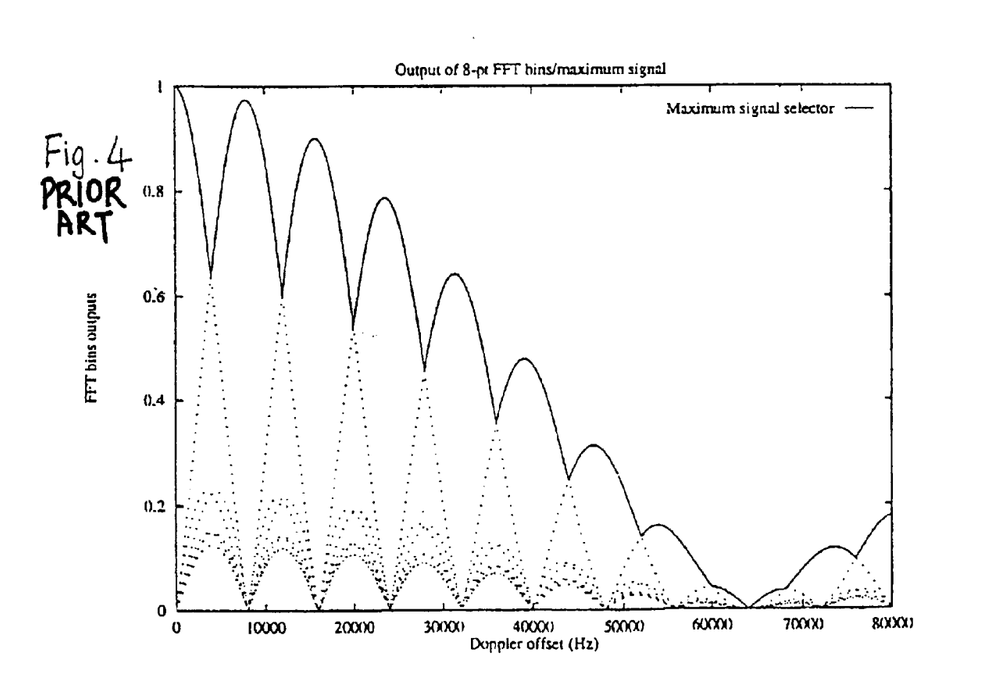
FIG. 4 shows the output of the system shown in FIG. 3.

A specific example should illustrate this more effectively. Continuing with the previous example, where M=200 and $T_c$= 625 ns, in order to increase the bandwidth of the partial correlators to beyond +/−32 kHz, their length is decreased to X=25. Therefore the number of partial correlators is P=8. If N=P i.e. a 8-point FFT is selected, FIG. 4 depicts the output of a maximum signal selector superimposed on all the FFT bin outputs. The bandwidth of the FFT processor has increased, and is much improved over the standard complex correlator. To further increase the bandwidth, the length of the individual correlators should be reduced and the total number of correlators increased correspondingly.

This FFT enhancement will allow all possible code Doppler offsets to be searched simultaneously. However, a scalloping loss can be observed when the Doppler offset falls between two bins of the FFT. This will result in a reduced probability of detection for signals with these Doppler offsets, as compared to signals which occur in the centre of any given bin.

SUMMARY OF THE INVENTION

The present invention seeks to improve the acquisition time of a spread spectrum communication system, preferably through the reuse of FFT processing blocks. The approach taken is thought to be particularly applicable to third generation mobile systems, for which reuse and/or reconfiguration of hardware will be an important priority.

According to one aspect of the invention there is provided a communications terminal for use in a code division multiple access system, comprising a plurality of correlating means, each for correlating a part of a spreading code sequence relating to a signal to be acquired, and zero padded Fast Fourier Transform (FFT) means for operating on the output of the correlating means. The inclusion of a zero padded FFT increases the resolution of the FFT processor without increasing the overall bandwidth.

Preferably, the correlating means each comprise a complex matched filter correlator and preferably each correlator is of the same chip length, the product of the chip length of each correlator and the number of correlators being equal to the code length. Good results are obtained if the chip length of each correlator is 25 or less.

Preferably, the terminal includes a hard limiter at the input to the correlating means. This enables the use of cheap digital correlators.

The FFT means may in particular be a complex zero padded FFT processor which preferably has at least twice as many points as the number of correlators and may have four or eight times as many. The output of the FFT means may be supplied to a maximum signal selector for signal acquisition.

According to another aspect of the invention there is provided a method of operating a code division multiple access communications terminal so as (to acquire a given signal, comprising correlating the spreading code sequence of the given signal in a plurality of partial correlation operations, and processing the partial correlation results using a zero padded Fast Fourier Transform (FFT).

Preferably, prior to the correlation step, the signal is passed through a hard limiter, and preferably, after the FFT step, the maximum signal present is selected to acquire the given signal.

The invention utilises a FFT to simultaneously search all possible code Doppler offsets at one time, thus reducing the 2-dimensional search problem to a 1-dimensional search for code phase. By zero padding the FFT increased frequency accuracy is provided, which ensures that desired signals with Doppler offsets which lie between two bins of the FFT are not masked.

BRIEF DESCRIPTION OF THE DRAWINGS

The present invention will now be described in more detail, by way of example only, with reference to the accompanying drawings, in which.

DETAILED DESCRIPTION OF THE PREFERRED EMBODIMENTS

Figure 5:
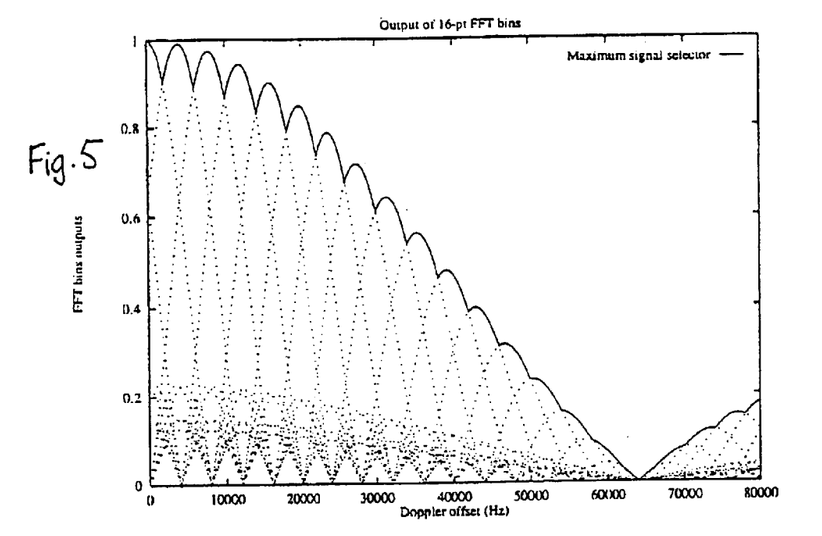
FIG. 5 shows the output of a system according to an embodiment of the invention.

FIG. 5 shows the response when a 16-point FFT is inserted in the system shown in FIG. 3, with the maximum signal selector superimposed. The number of correlators P=8, and their length X=25, remain unchanged. It can be seen that effectively there are more FFT output lobes in the same range of Doppler frequency uncertainty and therefore the scalloping loss is reduced.

In order to quantify the difference this padding effects, consider a signal with a Doppler offset of 28 kHz. This lies directly between two bins of the 8-point FFT shown in FIG. 4. The normalised magnitude response at this offset is approximately 0.46. However, when the 16-point padded FFT (FIG. 5) is employed the normalised response increases to approximately 0.7. It is clear that further levels of padding will further reduce the scalloping loss which occurs, however the rate of improvement decreases rapidly with increasing amounts of padding. For this scheme it is apparent that no further increase will be seen above a 64-point FFT.

The approach discussed above is an improvement of the swivelling correlator described by Sust et al. In Sust et al, the inclusion of FFT processing was seen as an additional burden on the processor, and therefore the FFT was kept as small as possible. Implementing a large FFT will not necessarily present such a problem in third generation terminals.

The earlier discussion neglected the impact of the hard limiter 3 which is placed at the input of the correlators. This has the effect of constraining the input to the first correlator to be either +/−1. This causes the statistics of the signal at the input to the correlators to be binomial, and when no signal is present this limiter constrains the variance of the noise. If the interference statistics can be assumed to be Gaussian, the hard limiter will result in a loss of approximately 2 dB. The simulation results presented below confirm this. In lightly loaded CDMA channels the interference statistics cannot be assumed to be Gaussian, and this loss will probably increase further. A worst case was highlighted by Sust et al, in which there are only two users with unbalanced power. The limiter will have the effect of suppressing the weaker user, although receiver dither can be successfully used to combat this problem.

Despite these limitations, the limiter 3 is still attractive from a digital signal processing perspective. The use of hard limiting allows single bit quantisation, and therefore cheap digital correlators can be employed as opposed to more costly analogue or high resolution digital processors. The simulation results presented herein include the impact of the hard limiter, however the more detailed problems highlighted in the above paragraph are not considered.

In order to quantify the possible improvements which can be gained by employing a padded FFT, some approximate theoretical expressions for the performance of the FFT based acquisition system are derived below. In particular, three performance measures are considered: false alarm probability, probability of detection and mean acquisition time.

A. Probability of False Alarm.

In this section, the probability of false alarm, $P_{fa}$, is derived, assuming that the desired signal is not present. The false alarm probability will depend upon the statistics of the noise at the input to the detector, and upon the threshold level employed in the detector. As a result of the limiter at the input to the correlators, the noise will have a binomial distribution, with unit variance and zero mean. If the correlators are assumed to be sufficiently long, the central limit theorem can be applied to show that the signals at the input to the FFT are uncorrelated and have Gaussian statistics. If each correlator is of length X, then each output will have variance X and mean zero. If there are P correlators, then the outputs of a zero padded N-pt FFT (i.e. N>P) will have variance PX(=M, the code length) and zero mean. The magnitude of the outputs of the FFT are used in the detector—these amplitude signals will be Rayleigh distributed with probability density function (pdf) given by $$p(r) = \frac{r}{M} e^{\frac{-r^2}{2M}} \qquad (2)$$

and cumulative distribution function (cdf)

$$F(r) = 1 - e^{\frac{-r^2}{2M}} \qquad (3)$$

The probability that any one FFT output is greater than some threshold level t, is given by $$P[\text{output} > t] = e^{\frac{-t^2}{2M}} \qquad (4)$$

All of the FFT outputs have the same distribution, and therefore the probability of any one of the N outputs exceeding the threshold (and hence the probability of false alarm) is given simply by $$P_{fa} = 1 - \left(1 - e^{\frac{-t^2}{3M}}\right)^N \qquad (5)$$

B. Probability of Detection.

The derivation of the probability of detection follows that of the false alarm probability. In this case it is assumed that the desired signal and corrupting noise are present at the input to the acquisition system. Again the noise at the inputs to the FFT is assumed to be decorrelated and Gaussian with variance X and mean zero. If the mean desired signal level at the input to the acquisition system is X, then the mean signal level (in bin 0 at frequency 0 Hz) will be PXα=Mα. The output noise variance is M as before. At the output of the FFT, the amplitudes of the signals are taken, thus the statistics of the output of some FFT bin i are Rician, with pdf given by $$p_i(r) = \frac{r}{M} e^{-\left(\frac{r^2+s_i^2}{2M}\right)} I_0\left(\frac{rs_i}{M}\right) \qquad (6)$$

where $I_o$ is the zero-th order modified Bessel function, and $S_i$ is the summation of the mean of the signals on the inphase and quadrature branches for bin i, $$S_i^2 = m_I^2 + m_Q^2 \qquad (7)$$

The cumulative distribution function of the Rice distribution is given by $$F(r) = 1 - e^{-\left(\frac{r^2+s_i^2}{2M}\right)} \sum_{m=0}^{\infty} \left(\frac{s_i}{r}\right)^m I_m\left(\frac{rs_i}{M}\right) \qquad (8)$$

The probability that the amplitude of bin i is greater than some threshold t is given by $$P^i[\text{output} > t] = e^{-\left(\frac{r^2+s_i^2}{2M}\right)} \sum_{m=0}^{\infty} \left(\frac{s_i}{r}\right)^m I_m\left(\frac{rs_i}{M}\right) \qquad (9)$$

Signal acquisition is assumed if any of the output bins is greater than the threshold. Each of the N FFT output bins has the same distribution, and therefore the probability of any one of the N outputs exceeding the threshold (and hence the probability of detection) will be given by $$P_d = 1 - P_{no\ detection} \qquad (10)$$

$$P_d = 1 - \prod_{i=0}^{N} (1 - P^i[\text{output} > t]) \qquad (11)$$

C. Mean Acquisition Time.

The present analysis considers a single dwell detector. The acquisition model can be summarised as follows. Suppose there are q cells to be searched (through a combination of both code phase and Doppler uncertainty). Assume that if a hit is detected (i.e. the magnitude of any output of the FFT is greater than some threshold), the system goes into a verification mode that may include an extended dwell period and a code tracking loop period. The false alarm penalty of entering the verification mode when the desired signal is not present is modelled as $K\tau_d$, where the dwell or integration time is given by $\tau_d$. The mean acquisition time for such a single dwell system has been derived as $$\overline{T}_{acq} = \frac{(2-P_d)(1+KP_{fa})}{2P_d}(g\tau_d) \qquad (12)$$

In order to aid comparison between different systems, the mean acquisition time is often normalised to the integration time $T_d$ as follows $$\frac{\overline{T}_{acq}}{\tau_d} = \frac{(2-P_d)(1+KP_{fa})}{2P_d}(q) \qquad (13)$$

The mean acquisition time results presented below use values of $P_{fa}$ and $P_d$ derived from simulation, for a selection of false alarm penalty values.

The theoretical performance of the FFT acquisition scheme of the invention is now compared with Monte Carlo simulation results. The simulations investigate the effect of using increasingly larger padded FFTs on the three variables for which the theoretical values were derived above. For simplicity and consistency, the same system parameters are used as in the previous examples. To recap, a data rate of 8 kHz is assumed, with random codes of length M=200 which leads to a chip period of 625 ns. The partial correlators are of length X=25, which means that there are 8 inphase and quadrature inputs to the FFT block. The received sequence with the carrier offset of 28 kHz which was highlighted earlier is also considered below. This will clearly illustrate the improvement achieved by zero padding in the FFT.

A. False Alarm Probability.

Figure 6:
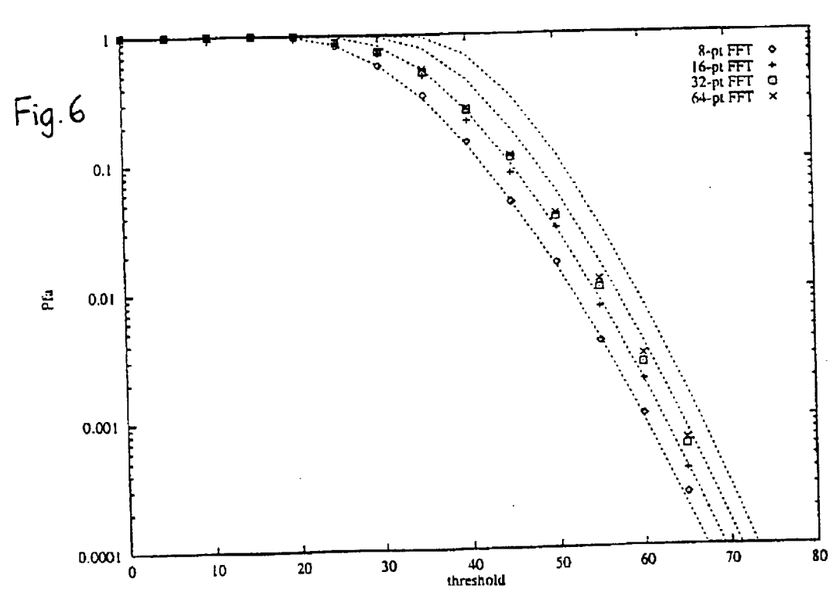
FIG. 6 is a graph of probability of false alarm in the system of FIG. 3 and in embodiments of the invention.

The first set of results concerns the probability of false alarm. FIG. 6 presents the results from Monte Carlo simulation of four different FFT sizes. The acquisition system was simulated with only noise present, and the simulation was terminated when either the equivalent of 1 million data bits had been transmitted, or 500 false alarm errors were collected.

The dotted lines in FIG. 6 depict the theoretical false alarm probability as computed by (5) against the threshold level in the detector. It is apparent that increasing the FFT size results in an increase in the probability of false alarm, since with more output bins there is an increased probability of any one individual bin exceeding the threshold. The theoretical curves assume that each of the N output bins of the FFT are independent and equally likely to exceed the threshold. However, there are only 8 non-zero and independent inputs to the FFT, which means that the output bins will not be truly independent. This effect is seen in the "saturation" observed in the simulated points—as the FFT size is successively increased the false alarm probability quickly reaches a maximum value. It will become apparent from the next set of results that it is possible to compensate for the increased probability of false alarm by improving the probability of detection.

B. Probability of Detection.

The theoretical probability of detection can be computed from (11) through the Markum Q function. A Q function evaluation algorithm was used to evaluate the theoretical curves for FIGS. 7 and 8. The Markum Q function is the infinite sum in (11), i.e.

$$Q\left(\frac{S_i}{\sigma}, \frac{t}{\sigma}\right) = e^{-\left(\frac{t^2 + s_i^2}{2M}\right)} \sum_{m=0}^{\infty} \left(\frac{S_i}{r}\right)^m I_m\left(\frac{rs_i}{M}\right) \quad (14)$$

Figure 7:
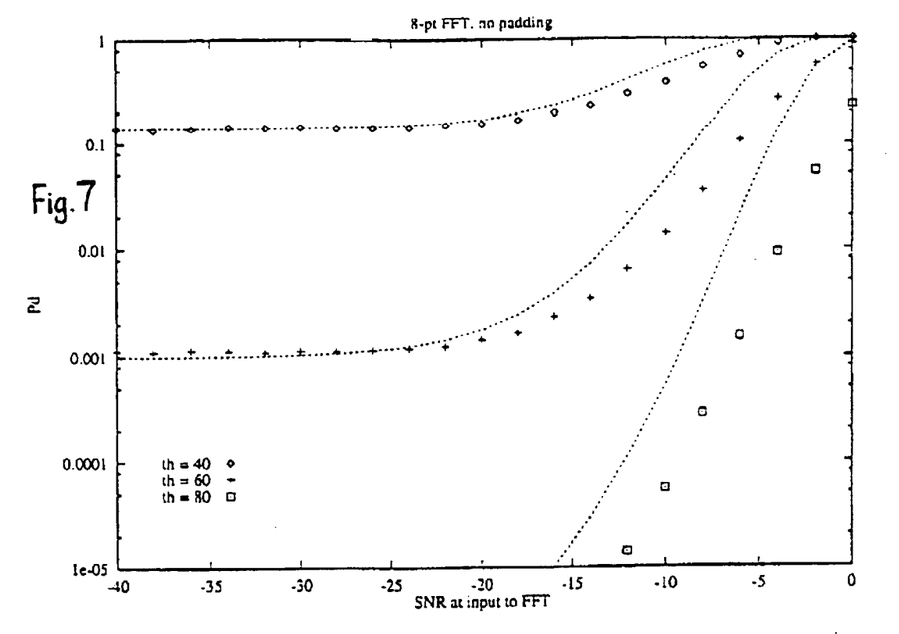
FIG. 7 is a graph of probability of detection in the system of FIG. 3.

The algorithm computes the value of Q(•, •) by using a truncated series approximation. FIG. 7 compares the theoretical and simulated values of probability of detection for an 8 point FFT for three threshold values at a Doppler offset of 28 kHz. The graph shows that as the threshold value is decreased the probability of detection is increased, andthat as the signal-to-noise ratio (SNR) increases the probability of detection also increases.

It is also possible to see the impact of hard limiting on the performance of the detector. The limiter quantises the received signal into either +/−1 values, so that the individual outputs of the partial correlators have integer, rather than real values. Therefore, the rotating phasors which are observed at the partial correlator outputs are quantised in value, rather than following their theoretically continuous pattern. Provided the correlators are sufficiently long, and the noise is dominant, this quantisation error will be small. When Gaussian noise corrupts the input to a hard limiter, it has the effect of linearising the limiter's operating characteristic. At higher SNR values, the characteristic is more nonlinear (when no noise is input the limiter characteristic is extremely nonlinear), so that the impact of the quantisation is only seen at higher SNR values. The theoretical curves, shown dotted in FIG. 7, do not include the operation of the limiter to illustrate the loss in performance due to this quantisation error.

Figure 8:
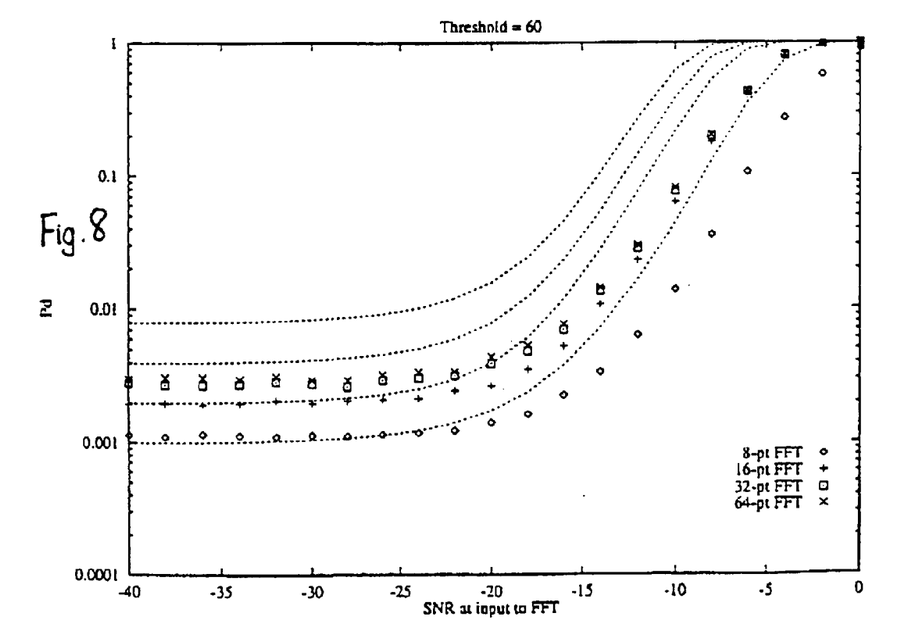
FIG. 8 is a graph as FIG. 7, but also relating to embodiments of the invention.

The next set of results considers the improvement which can be achieved by zero padding the FFT to increase the frequency resolution. FIG. 8 contrasts four FFT sizes, for a detection threshold of 60. As was predicted, the probability of detection increases as the FFT size increases. However, a similar saturation effect can be seen as was observed in the false alarm probability results. This occurs because the theoretical curves assume that each output bin of the FFT has an equal probability of containing the desired signal, however the outputs of a padded FFT are weakly dependent and this is evidenced in the lack of improvement in the detection probability above FFT sizes of around 64. Despite this saturation effect, the addition of zero—padding to the FFT has improved the probability of detection by a factor of approximately 3. Again, the Doppler offset is 28 kHz and the dotted theoretical curves neglect the effect of hard limiting.

C. Mean Acquisition Time.

The mean acquisition results use (13) with values for $P_d$ and $P_{fa}$ derived from the earlier simulation studies. The results presented here consider the two false alarm penalty values, K=1, 50. These values represent two different extremes, and so help to illustrate the dependence between the increased false alarm rate and improved probability of detection.

Figure 9:
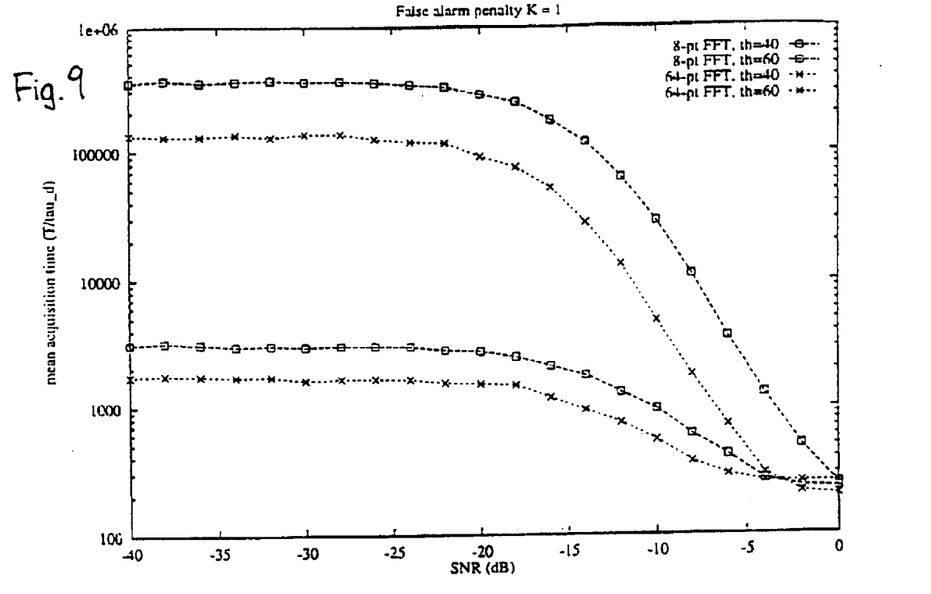
FIGS. 9 and 10 are graphs of mean acquisition time in the system of FIG. 3 and in an embodiment of the invention, for two different respective false alarm penalty values.
Figure 10:
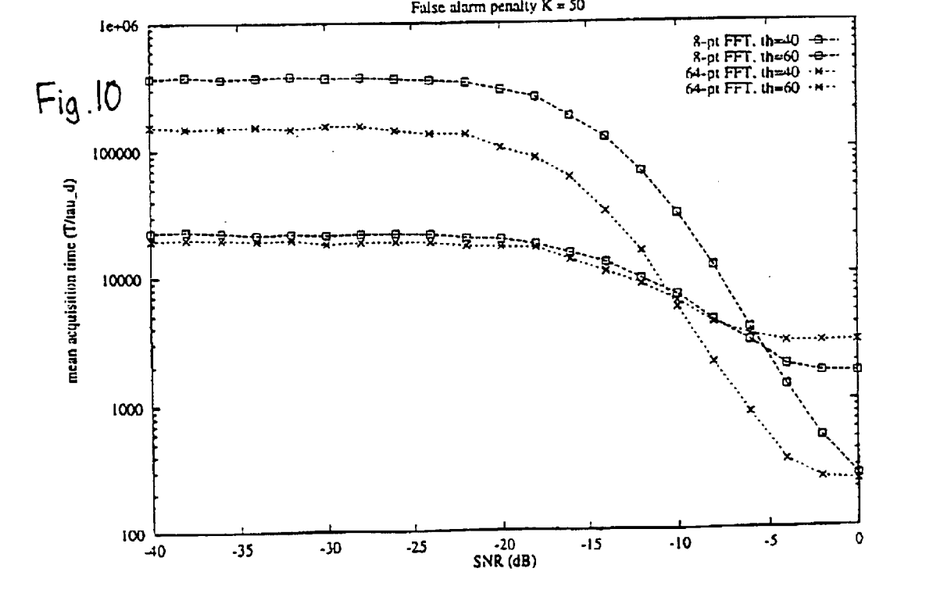

FIGS. 9 and 10 depict the mean acquisition time as a function of SNR, with K=1 and K=50, respectively. It is apparent that the use of the larger (padded) FFT results in a decrease in the mean acquisition time for both false alarm penalty values. The improvement is most dramatic for higher threshold values. With a detection threshold of 60 and K=1, the mean acquisition time for the 64 point FFT is approximately one third that of the 8 point FFT. However, for a threshold of 40 with K=50 there is little difference in mean acquisition time between the two FFT sizes. FIG. 10 shows that at high SNR values it would be preferable to impose a larger detection threshold, since the large value of false alarm penalty makes false alarms more dominant in the acquisition time.

The present invention thus provides an improved acquisition scheme for direct sequence spread spectrum communications. The technique reuses FFT hardware available from other functions to simultaneously search all code Doppler offsets, and thereby reduce the mean acquisition time. The reuse of hardware (for example OFDM receiver hardware) in a manner similar to this will prove vital to the success of future third generation communication terminals.

When the code Doppler shift of the desired sequence falls between two bins of the FFT, zero padding of the FFT block can lead to reductions in the acquisition time. Zero padding results in a slight increase in the false alarm probability, however this is compensated for by an increase in the probability of detection.

The method of the invention holds promise for implementation in future reconfigurable terminals in mobile and satellite communications systems.

What is claimed is:

1. A communications terminal for use in a code division multiple access system, comprising a plurality of correlating means, each for correlating a part of a spreading code sequence relating to a signal to be acquired, and zero padded Fast Fourier Transform (FFT) means for operating on the output of the correlating means, wherein the FFT means operates on the output of the correlating means to enable different possible frequency offsets to be simultaneously analyzed, and wherein the FFT means operates on the output of the correlating means to enable the different possible frequency offsets to be simultaneously analyzed to enable selection of Doppler offset for a selected output.

2. A communications terminal according to claim 1, wherein the correlating means each comprise a complex matched filter correlator.

3. A communications terminal according to claim 2, wherein each correlator is of the same chip length and wherein the product of the chip length of each correlator and the number of correlators defines the length of the spreading code.

4. A communications terminal according to claim 3, wherein the chip length of each correlator is 25 or less.

5. A communications terminal according to claims 1, 2, 3 or 4, including a hard limiter at the input to the correlating means.

6. A communications terminal according to claims 1, 2, 3 or 4, wherein the FFT means includes a complex zero padded FFT processor having at least twice as many points as the number of correlating means.

7. A communications terminal according to claim 6, wherein the FFT processor has four times as many points as the number of correlating means.

8. A communications terminal according to claim 6, wherein the FFT processor has eight times as many points as the number of correlating means.

9. A communications terminal according to claim 6, wherein the output of the FFT means is supplied to a maximum signal selector for signal acquisition.

10. A method of operating a code division multiple access communications terminal so as to acquire a given signal, comprising:

correlating the spreading code sequence of the given signal in a plurality of partial correlation operations;

processing the partial correlation results using a zero padded Fast Fourier Transform (FFT), wherein the partial correlation results are processed using a zero padded FFT to enable different possible frequency offsets to be simultaneously analyzed; and Analyzing the different possible frequency offsets simultaneously to enable selection of a Doppler offset for a selected output.

11. A method according to claim 10, wherein, prior to the correlation step, the signal is passed through a hard limiter.

12. A method according to claim 10 or 11, wherein, after the FFT step, the maximum signal present is selected to acquire the given signal.

* * * * *